April 17, 1928. 1,666,483
J. E. BELL
SECTIONAL WATER BACK
Original Filed July 26, 1924    2 Sheets-Sheet 1
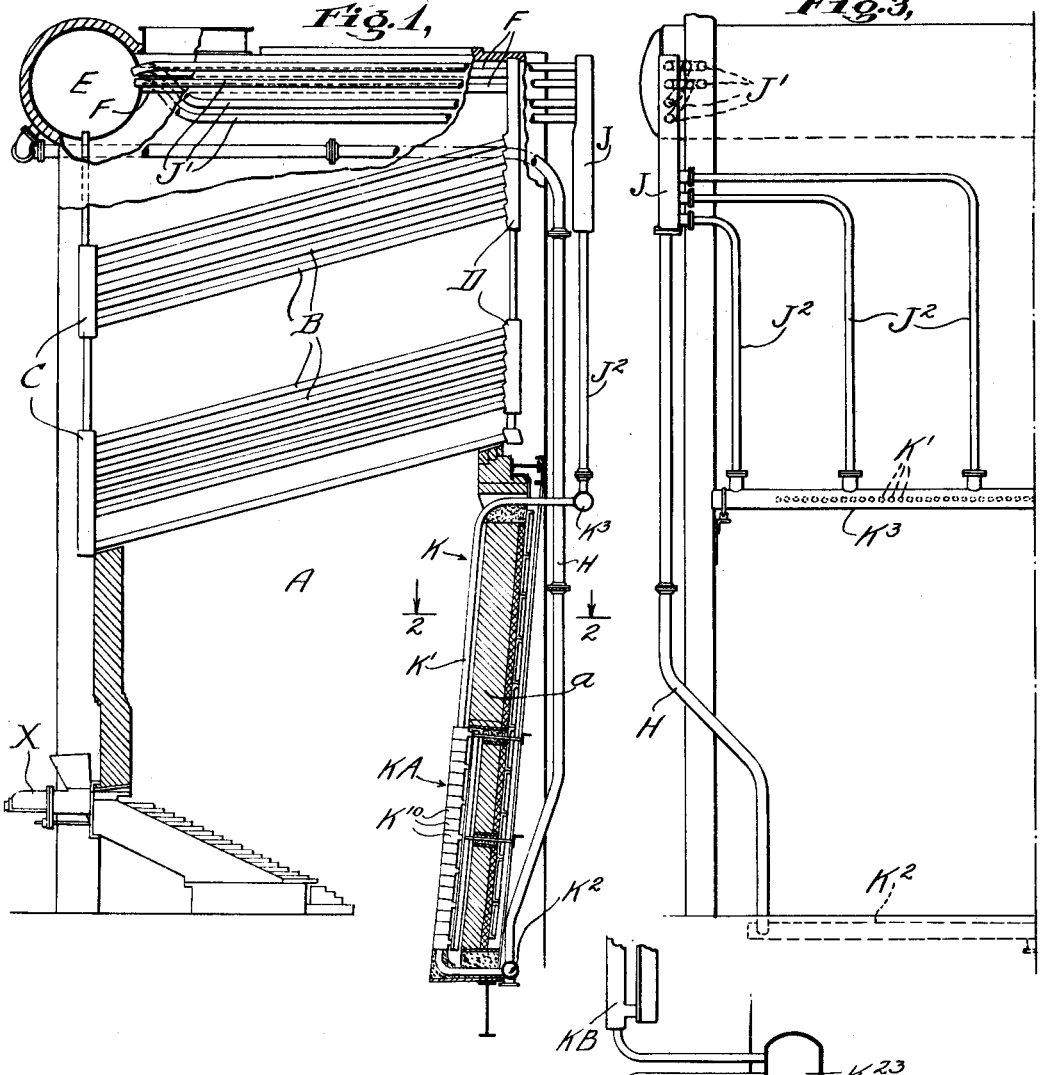
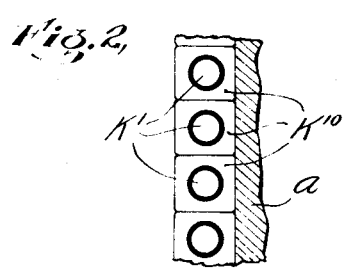
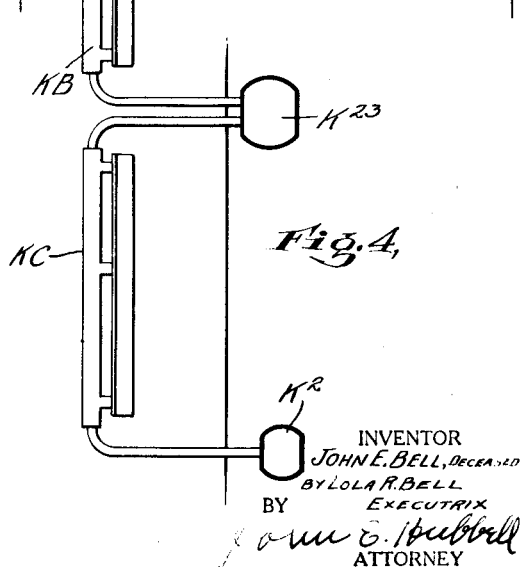
INVENTOR
JOHN E. BELL, Deceased
BY LOLA R. BELL
EXECUTRIX
ATTORNEY

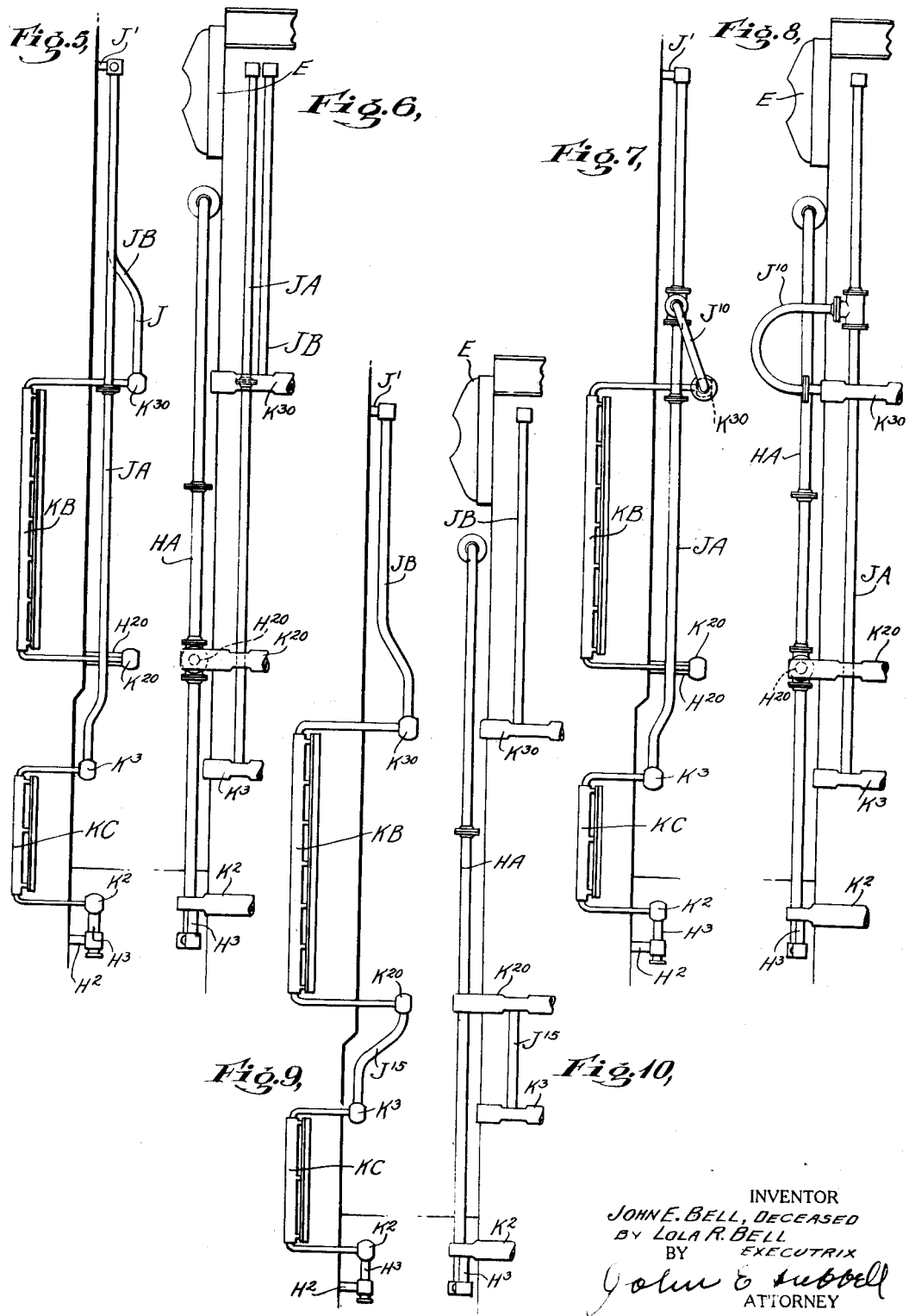

Patented Apr. 17, 1928.

1,666,483

UNITED STATES PATENT OFFICE.

JOHN E. BELL, DECEASED, LATE OF BROOKLYN, NEW YORK, BY LOLA R. BELL, EXECUTRIX, OF JACKSON HEIGHTS, NEW YORK, ASSIGNOR TO FOSTER WHEELER CORPORATION, OF NEW YORK, N. Y., A CORPORATION OF NEW YORK.

SECTIONAL WATER BACK.

Original application filed July 26, 1924, Serial No. 728,306. Divided and this application filed January 26, 1926. Serial No. 83,789.

The general object of the present invention is to provide an improved water back or channeled structure forming a conduit lining for the combustion chamber or clinker pit walls of a boiler furnace and incorporated in the water circulating system of the boiler, and serving to eliminate or minimize the injurious effects on said walls of high combustion chamber temperatures, slag and the abrasive action of fuel and ashes, and which at the same time desirably and efficiently augments the boiler heating surface, or reduces the amount of such surface otherwise required in a boiler of given capacity.

The use of a water back lining for clinker pit walls and portions of the combustion chamber walls adjacent the fuel bed in boiler furnaces has long been known, and the present tendency to more efficient combustion, in many cases by the use of preheated air for combustion, with a resultant increase in combustion chamber temperature above those at which combustion chamber walls formed of refractories in the usual manner are durable, have led to attempts to extend water backs to protect portions of the combustion chamber walls remote from the fuel beds. Heretofore, however, the use of such water backs has been attended with certain serious practical disadvantages which it is the object of the present invention to overcome.

In water backs as heretofore used in boiler furnaces, difficulty has been experienced from the destruction of the water backs by contact with the fuel or burning gases, particularly with the high combustion chamber temperatures necessary for high thermal efficiency. In accordance with the present invention, I form water backs out of conduit elements of the character which have been developed for use in so-called radiant heat superheaters, and in the preferred mode of practicing my invention I employ elements of the character disclosed in my prior Patent No. 1,296,739, which are composed of wrought steel tubes enclosed by a relatively massive cast metal casing usually formed of perforated blocks of cast iron strung on the tubes and shrunk in place thereon. This new use of the conduit elements disclosed in my said prior Patent No. 1,296,739, is attended with important advantages not attained in the use of such elements in superheating steam, and an understanding of which may be facilitated by the following explanation:

In a boiler furnace, regardless of the character of the fuel burned, the combustion chamber walls are inevitably subjected to the alternate action of reducing and oxidizing flames. Regardless of how much excess air for combustion may be supplied, the exposed surfaces of the combustion chamber walls will be occasionally licked by tongues of flame and bodies of burning gases which are reducing in character, and regardless of how low a percentage of excess air for combustion may be employed, the same surfaces will be intermittently licked by tongues of flames and bodies of burning gas which are highly oxidizing. In the case of radiant heat superheaters, I have found that as an apparent result of this alternate oxidizing and reducing action, the cast iron casing blocks for the superheater elements in some furnace locations will rapidly deteriorate, the deterioration being largely due to a flaking off of the cast iron in flakes a sixty-fourth of an inch or so in thickness. I have discovered, however, that this flaking action does not occur, or at least in a degree seriously objectionable, when the cast iron encased tubes are used in a water back owing to the lower temperature at which the water filled elements are maintained. In consequence it is practically feasible to locate the water backs of the special construction described, in portions of the combustion chamber where such water backs are most useful, and where a superheater of the same construction could not be successfully employed.

Another and important advantage attained with water backs composed of tubes encased in heavy iron sections as described, for which there is no analogy in the case of a superheater constructed of similar elements, arises from the beneficial effect on the water circulation through the water backs of the heat storage and temperature equalizing effect of the casing.

With an ordinary water back formed of thin walled tubes and located in the portion of the furnace structure where it is most needed, it is almost impossible from a practical standpoint, to avoid occasional rates of heat absorption in localized portions of the water back which are high enough to produce steam pockets impeding, stopping, or even reversing the water circulation, especially as practical considerations make it necessary to keep the number of connections from the water backs into the boiler drums as small as possible. The formation of a steam pocket in an ordinary thin walled water back is apt to result in destructive overheating of the portion of the water back filled with steam. With water backs constructed in accordance with the present invention, steam pockets are not apt to be formed as the result of intermittent and temporary increases in the heat absorption rate of localized portions of the water back because of the heat storage capacity of the casing. In consequence of this heat storage capacity, on a sudden increase in the rate of heat absorption by any localized portion of the water back, an appreciable portion of the heat then absorbed is utilized in raising the temperature of the casing. This tends of itself to reduce the rate of heat absorption, and checks any sudden increase in the rate of heat transfer to the water space surrounded by the casing. Moreover the over heated localized portion of the water back casing transfers heat by conduction to adjacent portions of the casing as well as to the adjacent water space. Furthermore, when a steam pocket is formed in a localized portion of the water back, the portion of the water back structure between the steam pocket and the fire is not quickly overheated to the point of destruction because of the heat transfer by conduction from said portion to other portions of the water back.

Some of the advantages obtained with water backs formed of steel tubes encased in cast iron blocks may be obtained by the use of cast steel elements such as are now in use in radiant heat superheaters, but for water back purposes elements formed of wrought steel tubes encased in iron blocks are preferable to cast steel elements, because they are substantially cheaper, and because they do not have the tendency to bow or bend in planes parallel to their length which is characteristic of cast steel elements. The use in water backs of the wrought steel tubes encased in cast iron blocks also facilitates and cheapens the cost of making satisfactory end connections to the elements, and the tubes encased in cast iron may be readily cleaned internally which is necessary in the case of water backs but not in superheaters.

Where it is desirable to provide a combustion chamber wall of considerable vertical extent with water heating wall cooling provisions, those provisions in many cases may advantageously be divided into separate sections located at different levels, and the features of invention claimed herein are particularly concerned with such sectional water backs or walls.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is an elevation in section of a boiler furnace;

Fig. 2 is a partial section on the line 2—2 of Fig. 1;

Fig. 3 is a partial rear elevation of the portion of the boiler shown in Fig. 1;

Fig. 4 is a diagrammatic elevation of a portion of a boiler furnace in which the radiant heat absorbing elements incorporated in one combustion chamber wall are divided into two separate sets arranged one above another;

Fig. 5 is a view taken similarly to Fig. 4 illustrating another mode of connecting two water back sections into the boiler circulating system;

Fig. 6 is a partial rear elevation of the construction shown in Fig. 5;

Figs. 7 and 8 are views taken similarly to Figs. 5 and 6, respectively, illustrating a third connection arrangement; and Figs. 9 and 10 are views taken similarly to Figs. 5 and 6, respectively, illustrating still another connection arrangement.

In the drawing and referring first to the construction shown in Figs. 1, 2, and 3, A represents the combustion chamber of the boiler furnace at the upper end of which is located a water tube boiler. In the conventional form illustrated the boiler proper is of the so-called horizontal water drum cross type, the inclined water tubes B being connected at their ends into front and rear headers C and D. The headers C are connected by elongated nipples into the steam and water drum E, and the upper ends of the rear headers D are connected to the rear of the drum E by horizontal circulating tubes F. At the front side of the boiler a stoker X is shown at the bottom of the combustion chamber A beneath the lower ends of the tubes B.

Incorporated in or lining the rear wall of the combustion chamber and extending from below the level of the bottom of the stoker upward nearly to the level of the high ends of the boiler tubes B are water cooling provisions shown as comprising an upper section K and a lower section KA. The upper section K of the water back or water wall is formed by the bare upper portions of vertical tubes K' which, as shown, are located in front of the outer heat insulating portion *a*, of the boiler housing wall. The upper ends of the tubes K' are transversely bent and project through the wall *a*, and externally of the latter are connected to a header K³. The water back section KA is formed by the lower portions of the tubes K', and section casings therefor which may be, and as shown are formed of perforated blocks K¹⁰ of cast iron. These casing sections are rectangular in outline and are shrunk on the tubes K', and the various casing sections of the water back section K unite to form a smooth inner heat absorbing surface. The lower ends of the bare tubes K', below the casing sections K¹⁰ are outturned and extend through the boiler housing wall *a*, and are connected into a header K².

Suitable provisions should be made for supporting the water back and particularly the lower heavy section KA thereof, and for avoiding leakage through the housing wall *a*, as a result of the thermal expansion and contraction of the water back elements and the consequent movements of the out-turned end portions of the tubes K', but I have not thought it necessary to describe such provisions herein as they form no part of the present invention and are adequately disclosed moreover, in my prior application Serial No. 728,306, filed July 26, 1924, of which this application is a division, and in which claims are made on various novel features of the apparatus disclosed, but not claimed in this application.

In the construction illustrated in Fig. 1, 2, and 3, means are provided for connecting the water back into the boiler circulating system, which comprise downcomer pipes H, one at each side of the boiler, and each connected at its upper end into the lower portion of the steam and water drum preferably by transverse nipples or tubes which may bend to accommodate the relative expansion and contraction of the parts. Each downcomer H is connected at its lower end to the corresponding end of the header K². The header K³ is connected into the steam and water drum through vertical headers or risers J, one at each side of the boiler at the rear upper corner of the latter. Each header J is connected to the water back header K³ by one or more pipes J², and is connected to the steam and water drum by one or more horizontal pipes J' alongside the horizontal boiler circulating tubes F. As shown each header J is connected to the drum E by four tubes J', and a plurality of pipes J² connect each header J to the header K³ at distributed points along the length of the latter.

The water back formed by the sections K and KA directly cool the combustion chamber wall of which they form a part and indirectly cool and protect other walls of the combustion chamber partly by lowering the combustion chamber temperature and partly by their capacity for absorbing radiant heat from said other walls. This cooling of the combustion chamber walls is a matter of great practical importance, as the modern tendency to more efficient combustion with a relatively low amount of excess air and with that air preheated in many instances tends to the production of furnace chamber temperatures high enough to effect a rapid destruction of fire brick furnace walls. By abstracting heat from the combustion chamber with water backs incorporated in the combustion chamber walls as described herein, the most efficient combustion practically obtainable may be maintained without overheating the combustion chamber walls. While the heat which they absorb from the combustion chamber lowers the temperature of the furnace gases and decreases the amount of heat available for recovery by the ordinary boiler water tubes, the water backs and the radiant heat superheaters (not shown) form highly efficient heat absorbing devices, and their use permits of a reduction in the total boiler heating and superheating surface otherwise required for a given steam generating and superheating capacity.

The water back arrangements illustrated in Figs. 1 2 and 3, are characterized by the simplicity and effectiveness of the means by which they are connected into the water circulating system of the boiler proper and are supplied with water at the rapid rate required to keep the water back elements filled with water notwithstanding their rapid absorption of heat. It will be observed that notwithstanding the comparative simplicity of the pipe connections between the water backs and the boiler system proper, good advantage is taken of the circulation producing effect resulting from the difference in density of the water supplied through the downcomers H to the water backs and the ascending column of water in the risers J which is lighter both because the water is hotter and also because of entrained steam bubbles. It is especially to be noted that the down-comers H by virtue of their shape and disposition may readily be made of ample size to insure an adequate supply of water to the lower ends of the elements of the water back K. Furthermore, the character of the connections shown in Figs. 1 to 3, as well as in the other forms of the invention illustrated, permit of the ready use of the invention with existing types of boilers, and makes it possible to provide existing boiler furnace installations with water backs at a minimum of expense and trouble. The length of the horizontal tubes J', and the connections between the drum E and the horizontally turned upper ends of the downcomers H provide the flexibility required to accommodate thermal expansion and contraction in boiler and water backs.

Water backs composed of wrought steel tubes encased in cast iron blocks, as described, possess special advantages over water backs heretofore constructed in addition to the important advantages to which reference has already been made. As a result of the flexibility of the steel inner tubes and the relatively short length of the individual casing blocks, thermal expansion and contraction has small tendency to destroy the elements, and, in consequence, the elements unite to provide a heat absorbing surface which is smooth enough to minimize the adherence of slag and ashes and to facilitate the cleaning of the surface when this is necessary. Furthermore, the massive character of the casing blocks renders them immune to injury by the impingement of bars or other tools used in removing adhering slag. It will be apparent, of course, that should conditions of use result in surface injury to the casing blocks, much such surface deterioration may occur without appreciable reduction in the effectiveness of the water back. While the joint between the tubes and the casing blocks offers resistance to the flow of heat from the casing blocks into the tubes, this is not especially objectionable from any point of view, because this resistance is never sufficient to prevent the rate at which heat is taken up by the water from being rapid enough to make the element an extremely efficient portion of the boiler heating surface, and moreover, the reduction in effective heat absorption caused by this point resistance tends to the avoidance of difficulties in maintaining a proper water circulation. The use of an effective water back immediately adjacent the fuel bed is especially advantageous because of their slag cooling effect, which prevents any such serious results from slag adherence to the furnace walls as is a common source of annoyance and injury to ordinary fire brick combustion chamber walls, particularly when the furnace is provided with a mechanical stoker which is intermittently operated.

The use of the invention makes it readily possible to extend the water back section KA at the rear of the stoker downward as far as may be required to effectually cool the slag and ashes passing to the ash removing means illustrated in part only and to protect the latter as well as the adjacent portion of the stoker mechanism against overheating by absorbing radiation heat therefrom.

The fact that the upper portions of the vertically disposed parts of the tubes K' in the particular arrangement shown in Figs. 1, 2, and 3, are not surrounded by casing blocks of cast metal but are directly exposed to the interior of the combustion chamber, reduces the heat absorption by the elements which is desirable when, owing to their relatively great length the elements would otherwise tend to absorb heat at a rate so rapid as to unduly cool the combustion chamber, or would make it difficult to keep the elements filled with water by gravity circulation. The circulation in the water back KA is aided by the provision of a plurality of take-off pipes $J^2$ connected to the upper back header $K^3$ at intervals along the latter.

It is sometimes desirable to divide the waterback incorporated in a single furnace wall into section even though both sections are advantageously of the same type. This reduces the length of the individual waterback elements, and also makes it possible by spacing the sections apart to effectively cool a wall with less heat absorption than if the water back were not divided into sections. Figs. 4 to 10 illustrate various ways of connecting the sections of a water back or water wall comprising an upper section KB and a lower section KC. Each of the sections KB and KC differ from the water back K, KA, only in that the vertical body portion of each water back is encased for its full length as in the section KA.

In Fig. 4 the sections KB and KC are relatively close together and are connected by a header $K^{23}$ to which the out-turned inner tube element ends at the bottom of the section KB and at the top of section KC are connected.

As shown in Figs. 5 and 6, water is supplied to the inlet header $K^2$ of the water back section KC through branches $H^2$ and $H^3$ from downcomers HA which may be similar in their arrangement and in their connections to the water drum E, to the downcomers H previously described. The inlet header $K^{20}$ of the water back section KB is supplied with water from the downcomer pipes HA by branch pipes $H^{20}$. The outlet headers $K^3$ and $K^{30}$ of the water back sections KB and KC are separately connected at their ends to the steam and water drum by means of individual risers JA and JB, respectively, each of which may be similar to the riser J of Figs. 1 and 3, and be similarly connected by tubes J' to the drum E. With this arrangement the two water back sections KC and KB are connected in parallel so to speak, between the common downcomers HA and the steam and water drum.

In the arrangement shown in Figs. 7 and 8, the water flow through the elements of the water back section KC and KB is in parallel as in Figs. 5 and 6, but in lieu of the separate risers JB for the water back section KB, the outlet header $K^{30}$ of the latter is connected at its ends by bent pipes $J^{10}$ into the risers JA. Except for this difference the arrangement shown in Figs. 7 and 8 is the same as that shown in Figs. 5 and 6. The arrangement shown in Figs. 9 and 10 differs from that shown in Figs. 5 and 6 in the omission of the risers JA and by the addition of bent pipes $J^{15}$ connecting the ends of the outlet header $K^3$ of the water back section KC to the ends of the inlet header $K^{20}$ of the water back section KB, so that with this arrangement the water passes in series first through the elements of the water back section KC and then through the elements in the water back section KB.

While in accordance with the provisions of the statutes I have illustrated and described the best forms of my invention now known to me it will be apparent to those skilled in the art that changes may be made in the form of the apparatus disclosed without departing from the spirit of my invention and that certain features of my invention may sometimes be used with advantage without a corresponding use of other features.

Having now described my invention, what I claim as new and desire to secure by Letters Patent is:

1. In a steam generator comprising a combustion chamber and a boiler, the improvement which consists of a water back forming a lining for a portion of the combustion chamber wall and composed of upper and lower sections, each section being composed of vertically disposed tube portions and cast metal casings for the tube portions in the lower section.

2. In a steam generator comprising a combustion chamber and a boiler, the improvement which consists of a water back forming a lining for a portion of the combustion chamber wall and composed of upper and lower sections, each section being composed of vertically disposed tubes and cast metal casings for the tubes in each section.

3. In a steam generator comprising a water tube boiler and a combustion chamber beneath it, the improvement which consist in a water back lining for a wall of the combustion chamber said lining being divided into two sections one above the other and each section comprising a row of vertically disposed tubular elements at the inner side of said wall having transverse end portions extending through the wall, headers at the outer side of said wall one for and connected to each set of end portions and connections between the ends of the headers and the boiler proper for maintaining a gravity circulation of water through the elements of the two sections.

Signed at New York city, in the county of New York and state of New York, this 23 day of January, A. D. 1926.

LOLA R. BELL,
*Executrix of the last will and testament of John E. Bell, dec'd.*